2,694,725

PURIFICATION OF CANAIGRE TANNIN WITH AQUEOUS METHYL ETHYL KETONE

Edward M. Filachione, Philadelphia, Clarence W. Beebe, Hatboro, Edward H. Harris, Jr., Philadelphia, and Fred P. Luvisi, Elkins Park, Pa., assignors to the United States of America as represented by the Secretary of Agriculture No Drawing. Application October 16, 1953,
Serial No. 386,677

5 Claims. (Cl. 260—473.6)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the extraction, recovery, and purification of canaigre tannin.

An object of this invention is to provide a process for extracting tannin from canaigre roots and for refining and purifying crude canaigre tannin. Another object is to provide canaigre tannin of high purity. Other objects will appear hereinafter.

Tannins are found in a wide variety of plant materials and have been produced commercially from many of them. It is well known that tannins from different plant sources differ significantly in their physical and chemical properties, as well as in their tanning action. These differences complicate extraction and purification procedures so that processes useful with one plant material are often of little or no utility with another. Recovery and purification of tannins is further complicated by wide differences in the associated nontannin impurities found in tannin extracts from different plant sources. Here an even greater range of differing physical and chemical properties is encountered; so much so that it is usually impractical to produce tannins of purity exceeding 60 to 80%. By "purity" is meant the ratio of tannins to total solubles in the extract.

The recovery of high purity tannin from canaigre roots has heretofore been practically impossible because of the peculiar properties of the tannin and because of the large amount of soluble nontannins present, particularly carbohydrates. When the tannin is extracted from canaigre roots by use of water, large amounts of starch, sugar, and other impurities are simultaneously extracted, thus yielding an extract of only about 40 to 60% purity. Such an extract has little value for tanning, is difficult to purify, and is not readily stored or used because of its vulnerability to microbial deterioration.

Various organic solvents have been proposed for use in extracting or purifying tannins, particularly ether, alcohol, acetone, ethyl acetate or mixtures of these. None of these is of practical utility for the extraction or purification of canaigre tannin because they either fail to dissolve the tannin or, if they dissolve the tannin, they also dissolve a large proportion of nontannins so that the product is of low purity.

We have now discovered that methyl ethyl ketone containing a minor proportion of water is not only an excellent solvent for canaigre tannin but also is substantially a non-solvent for the nontannins of canaigre. Because of these unique and highly desirable solvent properties, aqueous methyl ethyl ketone is extremely useful for the extraction of canaigre tannin from the roots, from aqueous extracts of the roots, or from dry tannin extracts obtained by evaporating the aqueous extracts to dryness.

At ordinary room temperature methyl ethyl ketone dissolves about 12.5% of water, and distillation of a mixture of ketone and water yields a one phase azeotropic mixture containing about 88.7% ketone and 11.3% water. While the percentage of water in the ketone used in our process is not critical, best results are obtained by use of at least 5%. As a matter of convenience we prefer to use either the saturated solution containing about 12.5% water or the azeotropic mixture containing about 11.3%. The latter is particularly convenient because the solvent is ordinarily recovered as the azeotrope and can thus be recycled without further treatment.

In the operation of our process the material containing canaigre tannin, whether it be the roots themselves, an aqueous extract of the roots, or a dried extract, is contacted with the methyl ethyl ketone, preferably in a continuous or semicontinuous countercurrent manner. The ketone is then recovered from the resulting solution by distillation of the ketone-water azeotrope. It is generally preferred that the ketone extract contain more water than is removed in recovery of the ketone so that after recovery of the ketone there remains an aqueous solution of tannin. This aqueous solution may then be used as is or it may be further concentrated by evaporation of water. If it is to be evaporated to dryness it is preferred that the later stages be carried out under vacuum to avoid possibility of heat damage to the product.

For the extraction of tannin from fresh canaigre roots the latter are first comminuted by chopping, shredding, crushing or grinding and then contacted with the solvent. Since the roots contain a high percentage of water, it is not necessary or desirable to add much, if any, water in addition to that in the ketone azeotrope. On the other hand, when extracting partially or completely dehydrated roots or when purifying dried extracts, it is usually preferred to add at least enough water to rehydrate the roots or dissolve the dried extract before, or simultaneously with, the solvent. Such addition of water results in faster extraction, easier and more complete recovery of solvent and, when working with dried extracts, in liquefication of the raffinate, thus facilitating mechanical handling.

The invention is further illustrated by the following examples:

Example I

Shredded canaigre roots were extracted with water and the aqueous extract was evaporated to dryness. The resulting crude tannin had the following analysis: total solids, 96.7%; soluble solids, 96.7%; nontannins, 50.6%; tannin, 46.2%; total sugars, 37.4%; ash, 4.3%; purity 47.7.

Twenty grams of the crude, dry tannin was dissolved in 180 g. of water. The resulting solution was extracted 5 times with 100 ml. portions of methyl ethyl ketone; the ketone extracts were combined and the ketone recovered by distillation of its azeotrope with water. The residue, which was now in the form of a concentrated aqueous solution, was evaporated to dryness in vacuum. There was thus obtained 10.1 g. of a friable solid which, unlike the crude tannin, was non-hygroscopic and which had the following analysis: total solids, 89.5%; soluble solids, 89.0%; nontannins, 8.1%; tannin 80.8%; total sugar, 2.6%; purity 90.9. Thus it is seen that there was achieved a great improvement in purity with a corresponding decrease in nontannins, particularly sugars. The recovery of tannin in this experiment was 88%.

The above experiment was repeated with the exception that the methyl ethyl ketone used contained 11.3% water (the azeotrope composition). There was no significant difference in the yield or purity of the tannin obtained. Likewise, substantially identical results were obtained when a 50% aqueous solution of crude tannin was used instead of the 10% solution used in the above experiment. However, it was found necessary to centrifuge the mixed liquids in the first extraction stage in order to achieve a quick, clean separation of the liquid layers.

Example II

Ten grams of the solid, crude canaigre tannin used in Example I was extracted 6 times with 20 ml. portions of methyl ethyl ketone-water azeotrope. The combined extracts were evaporated to dryness to yield 5.3 g. of tannin of 90% purity.

Example III

Four hundred seventy-five grams of freshly shredded canaigre roots (solids content, 40%) were divided into 4 equal parts. The first part was leached with 250 ml. of methyl ethyl ketone-water azeotrope, after which the solvent was decanted onto the second portion of roots, and so on for the third and fourth portions of roots. This process was repeated with 4 additional 250 ml. portions of solvent, thus simulating a semicontinuous, countercurrent extraction process. The liquid extracts were combined, the ketone-water azeotrope was recovered by distillation and the residue was evaporated to dryness under vacuum. There was thus obtained 44.4 g. (69% yield) of tannin having the following analysis: total solids, 89.6%; soluble solids, 86.2%; nontannins, 5.8%; tannin 80.3%; total sugar, 1.4%; purity 93.3.

Example IV

An apparatus similar to that described by Ashley, et al., Ind. Eng. Chem., Anal. Ed., 10, 367 (1938) was used for the continuous extraction of 1500 ml. of a solution of crude tannin having the following analysis: total solids, 6.3%; nontannins, 3.8%; tannin, 2.5%; purity, 4.03%. By refluxing the methyl ethyl ketone-water azeotrope in the apparatus for 30 hours there was obtained 640 ml. of solution having the analysis: total solids, 6.8%; nontannins, 0.7%; tannin, 6.0%; purity, 89.4. The recovery of tannin was 99%.

When the methyl ethyl ketone used in Example I was replaced with ethyl acetate, sec.-butyl alcohol, tert.-amyl alcohol or methyl isobutyl ketone, the results achieved were unsatisfactory because either the solvent failed to extract the tannin or it simultaneously extracted an excessive proportion of nontannins so that the product was of low purity. Similarly unsatisfactory results were obtained when the methyl ethyl ketone of Examples II and III was replaced with acetone, methanol, ethanol or isopropanol.

When the crude canaigre extract used in Example I was replaced with wattle extract of 74% purity, a product of 94% purity was obtained in a yield of 65%. In contrast, when mangrove bark extract was used instead of the crude canaigre tannin used in Example I, none of the tannin was dissolved in the methyl ethyl ketone.

While the extraction experiments described in Examples I–IV were conducted at ordinary room temperature, we have found that moderate warming may be employed and sometimes accelerates the extraction.

We claim:

1. The process for recovering canaigre tannin from materials containing it comprising contacting the tannin-containing material with methyl ethyl ketone in the presence of at least about 5% of water, said percentage being based on the amount of methyl ethyl ketone used, and then recovering the thus dissolved tannin from the ketone solvent.

2. The process for recovering tannin from canaigre roots comprising comminuting the roots; contacting the comminuted roots with methyl ethyl ketone in the presence of at least about 5% of water, based on the ketone used; and recovering the thus dissolved tannin from the ketone solvent.

3. The process for purifying crude canaigre tannin comprising dissolving the crude tannin in water, contacting the aqueous solution with methyl ethyl ketone, and recovering the purified tannin from the thus obtained ketone solution.

4. The process for recovering high purity tannin from aqueous extracts of canaigre roots comprising contacting the aqueous extract with methyl ethyl ketone and recovering the tannin from the thus formed methyl ethyl ketone solution.

5. The process for recovering canaigre tannin from materials containing it comprising contacting the tannin-containing material with methyl ethyl ketone in the presence of more than enough water to form the azeotropic mixture with the amount of methyl ethyl ketone used, separating the liquid from any solid present, recovering the methyl ethyl ketone from the liquid by distillation as the ketone-water azeotrope, and recovering the tannin from the remaining aqueous phase.

No references cited.